(12) United States Patent
Jang

(10) Patent No.: US 9,835,074 B2
(45) Date of Patent: *Dec. 5, 2017

(54) APPARATUS AND METHOD FOR REMOVING POISON OF LAMBDA SENSOR

(71) Applicant: HYUNDAI MOTOR COMPANY, Seoul (KR)

(72) Inventor: HwaYong Jang, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 216 days.

This patent is subject to a terminal disclaimer.

(21) Appl. No.: 14/956,080

(22) Filed: Dec. 1, 2015

(65) Prior Publication Data
US 2017/0082009 A1 Mar. 23, 2017

(30) Foreign Application Priority Data
Sep. 18, 2015 (KR) .................. 10-2015-0132436

(51) Int. Cl.
*B08B 7/04* (2006.01)
*F01N 13/00* (2010.01)
*F01N 9/00* (2006.01)

(52) U.S. Cl.
CPC ............ *F01N 13/008* (2013.01); *F01N 9/00* (2013.01); *F01N 2560/025* (2013.01); *F01N 2560/20* (2013.01); *F01N 2900/0416* (2013.01); *Y02T 10/47* (2013.01)

(58) Field of Classification Search
CPC ........... F01N 2560/025; F01N 2560/20; F02D 41/042; F02D 41/123; F02D 41/1454; F02D 41/1494; F02D 41/1495; G01M 15/104
See application file for complete search history.

(56) References Cited

U.S. PATENT DOCUMENTS

| 5,816,231 A * | 10/1998 | Inoue | F01N 11/007 123/689 |
|---|---|---|---|
| 6,789,533 B1 * | 9/2004 | Hashimoto | F02D 41/123 123/434 |
| 2011/0036069 A1 * | 2/2011 | Hahn | F02D 41/1454 60/273 |
| 2014/0047912 A1 | 2/2014 | Oesselke et al. | |

(Continued)

FOREIGN PATENT DOCUMENTS

| JP | H11-082112 A | 3/1999 |
|---|---|---|
| KR | 10-0667405 B | 1/2007 |

(Continued)

*Primary Examiner* — Jesse Bogue
(74) *Attorney, Agent, or Firm* — Brinks Gilson & Lione

(57) ABSTRACT

An apparatus for removing a poison of a lambda sensor includes: a lambda sensor detecting an oxygen concentration included in an exhaust gas; and a control unit differentiating a heating temperature and a heating time to remove poison from the lambda sensor depending on a lambda signal output from the lambda sensor when a heating condition of the lambda sensor and an overrun section of an engine are satisfied. By heating the lambda sensor depending on the magnitude of the lambda signal output from the lambda sensor, the lambda sensor may be inhibited from being degraded by combusting the material poisoned to the electrode of the lambda sensor and the failure of the lambda sensor may be correctly determined.

16 Claims, 7 Drawing Sheets

(56) References Cited

U.S. PATENT DOCUMENTS

| | | | |
|---|---|---|---|
| 2014/0156172 A1* | 6/2014 | Surnilla | F01N 11/00 701/104 |
| 2014/0190149 A1* | 7/2014 | Umemoto | F01N 11/007 60/276 |
| 2016/0032812 A1* | 2/2016 | Lee | F02D 41/1441 73/114.73 |
| 2016/0123842 A1* | 5/2016 | Yoo | F02D 41/1494 73/1.06 |

FOREIGN PATENT DOCUMENTS

| | | |
|---|---|---|
| KR | 10-2013-0025625 A | 3/2013 |
| KR | 10-2013-0034457 A | 4/2013 |

\* cited by examiner

APPARATUS AND METHOD FOR REMOVING POISON OF LAMBDA SENSOR

CROSS-REFERENCE TO RELATED APPLICATION

This application claims priority to and the benefit of Korean Patent Application No. 10-2015-0132436, filed on Sep. 18, 2015, which is incorporated herein by reference in its entirety.

FIELD

The present disclosure relates to an apparatus and a method for removing a poison of a lambda sensor.

BACKGROUND

The statements in this section merely provide background information related to the present disclosure and may not constitute prior art.

Generally, a diesel engine shows merits on fuel consumption and output torque, but it shows drawbacks in exhaust gas. That is, although the diesel engine produces less carbon monoxide CO and hydrocarbon HC, it produces more nitrogen oxide (typically called NOx) and particulate matters because of its high temperature of the combustion chamber due to its high compression ratio.

Typically, particulate matters can be reduced by combustion control, however, we have discovered that there is a dilemma that an emission control scheme for reducing NOx may result in an increase of particulate matters, and an emission control scheme for reducing particulate matters may result in an increase of NOx, such that it is difficult to reduce both the NOx and particulate matters.

Usually, a diesel engine is provided with a diesel catalyzed particulate filter (CPF) for reducing the particulate matters.

The CPF collects the particulate matters exhausted by the engine, and when more than a predetermined amount of the particulate matters are collected, the CPF is regenerated by burning the particulate matters collected in the CPF by increasing the exhaust gas temperature by employing post-injection.

On the other hand, a diesel engine is typically provided with an exhaust gas temperature sensor that senses an exhaust gas temperature at an upstream side of a turbocharger, and such detection of the exhaust gas temperature is useful for preventing overheating of the turbocharger, for limiting the exhaust gas temperature, and for preventing overheating of the CPF.

In addition, a lambda sensor is typically provided at a downstream side of the turbocharger in order to measure an air/fuel ratio for the purpose of controlling EGR and adjusting fuel injection.

Thus, an engine control unit (ECU) controls the fuel injection and post-injection, based on the data obtained by the exhaust gas temperature sensor and the lambda sensor located at the upstream and downstream sides of the turbocharger.

In this case, an electrode to measure an oxygen concentration is provided inside the lambda sensor, however we have discovered that the electrode of the lambda sensor is poisoned by various factors (for example, a poison due to a siloxane). If the electrode of the lambda sensor is poisoned, a lambda signal output from the lambda sensor is deteriorated.

The above information disclosed in this Background section is only for enhancement of understanding of the present disclosure and therefore it may contain information that is not already known to a person of ordinary skill in the art.

SUMMARY

The present disclosure provides an apparatus for removing a poison of a lambda sensor and a method thereof preventing the output signal of the lambda sensor from being deteriorated due to the poison of the electrode of the lambda sensor by various reasons.

An apparatus for removing a poison of a lambda sensor according to an embodiment of the present disclosure may include: a lambda sensor detecting an oxygen concentration included in an exhaust gas; and a control unit differentiating a heating temperature and a heating time for the poison removing of the lambda sensor depending on a lambda signal output from the lambda sensor when a heating condition of the lambda sensor and an overrun section of an engine are satisfied.

The heating condition of the lambda sensor may be satisfied when coolant temperature is greater than a predetermined coolant temperature in an idle state of the engine and outdoor temperature is greater than a predetermined outdoor temperature.

The overrun section of the engine is one in which the vehicle is in a coasting state or a braking state.

The control unit may increase the heating temperature and the heating time step-by-step as the lambda signal is increased if the lambda signal is larger than a maximum predetermined value during a predetermined time or more, or increase the heating temperature and the heating time step-by-step as the lambda signal is decreased if the lambda signal is smaller than a minimum predetermined value during the predetermined time or more.

The maximum predetermined value may be divided into a first maximum predetermined value, a second maximum predetermined value larger than the first maximum predetermined value, and a third maximum predetermined value larger than the second maximum predetermined value, and the minimum predetermined value may be divided into a first minimum predetermined value, a second minimum predetermined value smaller than the first minimum predetermined value, and a third minimum predetermined value smaller than the second minimum predetermined value.

If the lambda signal is larger than the first maximum predetermined value during a predetermined time or more or is smaller than the first minimum predetermined value during the predetermined time or more, the control unit may set the heating temperature and the heating time as a first heating temperature and a first heating time to heat the lambda sensor.

If the lambda signal is larger than the second maximum predetermined value during the predetermined time or more or is smaller than the second minimum predetermined value during the predetermined time or more, the control unit may set the heating temperature and the heating time as a second heating temperature higher the first heating temperature and a second heating time longer than the first heating time to heat the lambda sensor.

If the lambda signal is the third maximum predetermined value or more during the predetermined time or more or is the third minimum predetermined value or less during the predetermined time or more, the control unit may set the heating temperature and the heating time as a third heating temperature higher than the second heating temperature and a third heating time longer than the second heating time to heat the lambda sensor.

The control unit may determine that the lambda sensor is faulty if a number of heating times of the lambda sensor is a predetermined number or more.

A method for removing a poison of a lambda sensor according to another embodiment of the present disclosure may include: determining whether an overrun condition is satisfied in a state that an engine is driving; determining whether a lambda signal output from the lambda sensor is larger than a maximum predetermined value during a predetermined time or more or is smaller than a minimum predetermined value during a predetermined time or more; determining whether a heating condition of the lambda sensor is satisfied; and differentiating a heating temperature and a heating time for the poison removing of the lambda sensor depending on a magnitude of the lambda signal to heat the lambda sensor when the overrun condition and the heating condition are satisfied.

The heating condition of the lambda sensor may be satisfied when coolant temperature is greater than a predetermined coolant temperature in an idle state of the engine and outdoor temperature is greater than a predetermined outdoor temperature.

The overrun section of the engine may be one in which the vehicle is in a coasting state or a braking state.

If the lambda signal is larger than a maximum predetermined value during a predetermined time or more, the heating temperature and the heating time may be increased step-by-step as the lambda signal is increased, and if the lambda signal is smaller than a minimum predetermined value during a predetermined time or more, the heating temperature and the heating time may be increased step-by-step as the lambda signal is decreased.

The maximum predetermined value may be divided into a first maximum predetermined value, a second maximum predetermined value larger than the first maximum predetermined value, and a third maximum predetermined value larger than the second maximum predetermined value, and the minimum predetermined value may be divided into a first minimum predetermined value, a second minimum predetermined value smaller than the first minimum predetermined value, and a third minimum predetermined value smaller than the second minimum predetermined value.

If the lambda signal is larger than the first maximum predetermined value during a predetermined time or more or is smaller than the first minimum predetermined value during the predetermined time or more, the heating temperature and the heating time may be set as a first heating temperature and a first heating time to heat the lambda sensor.

If the lambda signal is larger than the second maximum predetermined value during the predetermined time or more or is smaller than the second minimum predetermined value during the predetermined time or more, the heating temperature and the heating time may be set as a second heating temperature higher than the first heating temperature and a second heating time longer than the first heating time to heat the lambda sensor.

If the lambda signal is the third maximum predetermined value or more during the predetermined time or more or is the third minimum predetermined value or less during the predetermined time or more, the heating temperature and the heating time may be set as a third heating temperature higher than the second heating temperature and a third heating time longer than the second heating time to heat the lambda sensor.

The method may further include: counting a number of times the lambda sensor is heated; and determining that the lambda sensor is faulty if the heating number is a predetermined number or more.

According to the poison removing apparatus of the lambda sensor and the method thereof according to an embodiment of the present disclosure, by heating the lambda sensor depending on the magnitude of the lambda signal output from the lambda sensor, the lambda sensor may be inhibited from being degraded by combusting the material poisoned to the electrode of the lambda sensor and the failure of the lambda sensor may be correctly determined.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
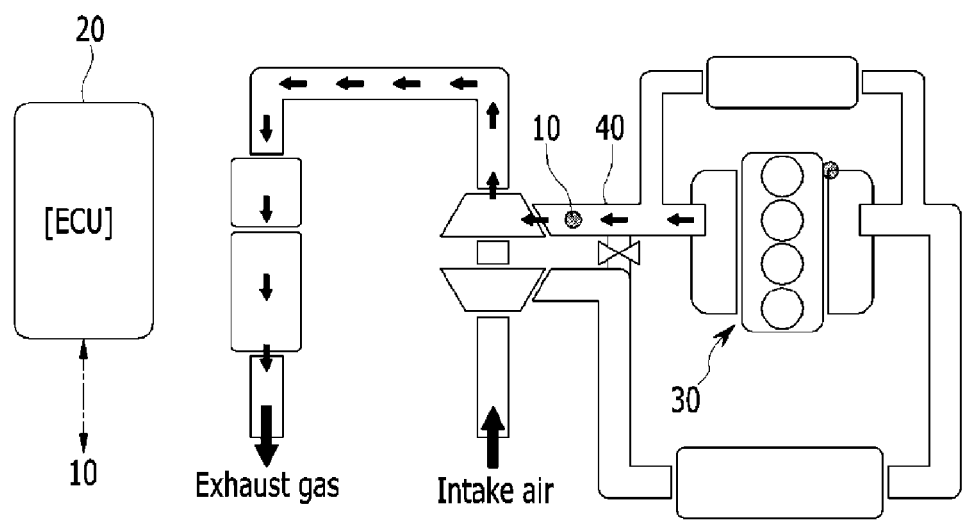
FIG. 1 is a schematic view showing a configuration of an engine system according to an embodiment of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As those skilled in the art would realize, the described embodiments may be modified in various different ways, all without departing from the spirit or scope of the present disclosure.

Like reference numerals designate like elements throughout the specification.

The sizes and thicknesses of the configurations shown in the drawings are provided selectively for convenience of description, such that the present disclosure is not limited to those shown in the drawings and the thicknesses are exaggerated to make some parts and regions clear.

Figure 2:
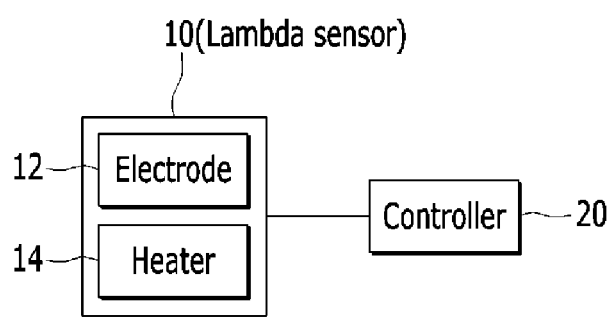
FIG. 2 is a block diagram showing a configuration of a poison removing apparatus of a lambda sensor according to the present disclosure.

Referring to FIGS. 1 and 2, an apparatus for removing a poison of a lambda sensor includes a lambda sensor 10 detecting an oxygen concentration included in an exhaust gas, and a control unit 20 differentiating a heating temperature and a heating time for the poison removing of the lambda sensor 10 depending on a lambda signal output from the lambda sensor 10 when a heating condition of the lambda sensor and an overrun section of an engine 30 are satisfied.

The lambda sensor 10 is generally installed on an exhaust line 40 in which an exhaust gas exhausted from the engine flows to sense the oxygen concentration included in the exhaust gas exhausted from a combustion chamber of the engine, thereby outputting a signal (lambda signal) of a lean/rich state of the exhaust gas. The lambda signal output from the lambda sensor 10 is provided to the control unit 20.

The lambda sensor 10 includes an electrode 12 sensing the oxygen concentration of the exhaust gas and a heater 14 heating the electrode 12.

The exhaust gas flowing to the exhaust line includes various particulate materials. If the electrode 12 of the lambda sensor 10 is poisoned by the particulate materials (for example, siloxane), the lambda signal output from the lambda sensor 10 is degraded.

Accordingly, when the electrode 12 of the lambda sensor 10 is poisoned, the control unit 20 heats the lambda sensor 10 to combust the material poisoning the electrode 12. The control unit 20 may be an electronic control unit (ECU).

The control unit 20 may be provided by at least one processor operated by a predetermined program, thereby executing each step of the poison removing method of the lambda sensor 10 through the predetermined program.

Whether the lambda sensor 10 is poisoned is determined if an overrun condition of the engine is satisfied. The overrun condition of the engine may be a case that the accelerator pedal is not depressed while the vehicle is driving, like a coasting state or a braking state of the vehicle.

If the vehicle is accelerated or decelerated sharply, the amount of the exhaust gas exhausted from the engine is sharply changed. If the amount of the exhaust gas is sharply changed, the oxygen concentration included in the exhaust gas may also be sharply changed. Accordingly, it is determined whether the poisoning of the lambda sensor 10 is generated or not in an overrun section in which the exhaust gas amount is relatively constantly maintained.

When the lambda sensor 10 is heated, the control unit 20 heats the lambda sensor 10 when the vehicle runs and a heating condition of the lambda sensor 10 is satisfied.

The heating condition of the lambda sensor 10 is satisfied when coolant temperature is greater than a predetermined coolant temperature in an idle state of the engine and outdoor temperature is greater than a predetermined outdoor temperature. For example, if the lambda sensor is heated when the coolant temperature and outdoor temperature are low in winter, power of a battery is excessively consumed and charge and discharge performance of the battery may be affected. Accordingly, in order to reduce an influence of charge and discharge performance of the battery, the heating condition of the lambda sensor 10 is limited as described above.

Meanwhile, the heating condition of the lambda sensor 10 may be satisfied when the vehicle is in a coasting state.

Here, the heating condition of the lambda sensor 10 means a condition that reduces an influence of vehicle behavior, emissions, fuel consumption, and so on. That is, the lambda sensor 10 can be heated whenever necessary during travelling of the vehicle.

If the lambda sensor 10 is heated when the engine is not operated, for example, in an after-run section of the vehicle, there is a problem that the battery is over-discharged or a dark current (leak current) is generated.

If the lambda signal is larger than a maximum predetermined value, the control unit 20 increases the heating temperature and the heating time step-by-step as the lambda signal is increased. Also, if the lambda signal is smaller than the minimum predetermined value, the control unit 20 increases the heating temperature and the heating time step-by step as the lambda signal is decreased.

Here, if the lambda signal is maintained between the maximum predetermined value and the minimum predetermined value, it means that the lambda sensor 10 is in a normal state. Accordingly, if the lambda signal is larger than the maximum predetermined value during a predetermined time or more or is smaller than the minimum predetermined value during the predetermined time or more, it is determined that the lambda sensor 10 is poisoned, and the control unit 20 heats the electrode 12 of the lambda sensor 10 of the heater 14 to combust the material poisoning the electrode 12.

That is, if the lambda signal is larger than the maximum predetermined value during the predetermined time or more, the control unit 20 increases the heating temperature and the heating time step-by-step as the lambda signal is increased, or if the lambda signal is smaller than the minimum predetermined value during the predetermined time or more, the control unit 20 increases the heating temperature and the heating time as the lambda signal is decreased.

Figure 7:
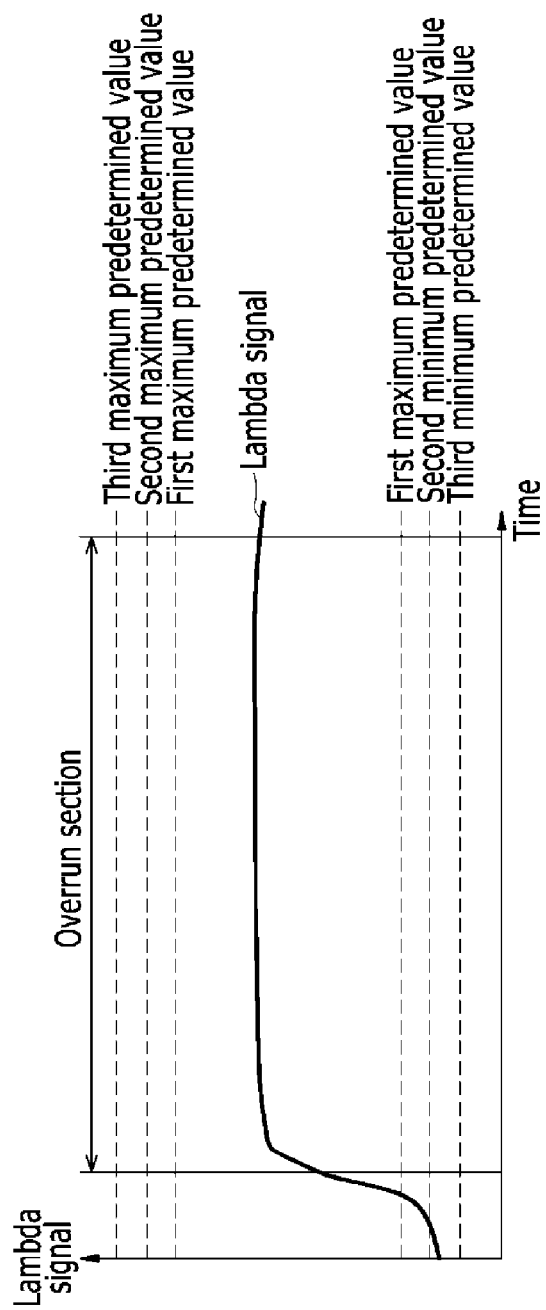
FIG. 7 is a graph to explain a poison removing method of a lambda sensor according to the present disclosure.

As shown in FIG. 7, the maximum predetermined value may be divided into a first maximum predetermined value, a second maximum predetermined value larger than the first maximum predetermined value, and a third maximum predetermined value larger than the second maximum predetermined value.

Also, the minimum predetermined value may be divided into a first minimum predetermined value, a second minimum predetermined value smaller than the first minimum predetermined value, and a third minimum predetermined value smaller than the second minimum predetermined value.

If the lambda signal is larger than the first maximum predetermined value during the predetermined time or more or is smaller than the first minimum predetermined value during the predetermined time or more, the control unit 20 sets the heating temperature and the heating time as a first heating temperature and a first heating time to heat the lambda sensor 10.

If the lambda signal is larger than the second maximum predetermined value during the predetermined time or more or is smaller than the second minimum predetermined value during the predetermined time or more, the control unit 20 sets the heating temperature and the heating time as a second heating temperature higher than the first heating temperature and a second heating time longer than the first heating time to heat the lambda sensor 10.

If the lambda signal is the third maximum predetermined value or more during the predetermined time or more or is the third minimum predetermined value or less during the predetermined time or more, the control unit 20 sets the heating temperature and the heating time as a third heating temperature higher than the second heating temperature and a third heating time longer than the second heating time to heat the lambda sensor 10.

After the control unit 20 performs a process of heating the lambda sensor 10 for removing the poison of the lambda sensor 10 a predetermined number of times (for example, two times), when the lambda signal is larger than the maximum predetermined value or is smaller than the minimum predetermined value, it is determined that the lambda sensor 10 is faulty.

Hereinafter, a method for removing the poison of the lambda sensor 10 according to an embodiment of the present disclosure will be described with reference to accompanying drawings.

FIG. 3 to FIG. 6 are flowcharts showing a method for removing a poison of a lambda sensor 10 according to an embodiment of the present disclosure.

Figure 3:
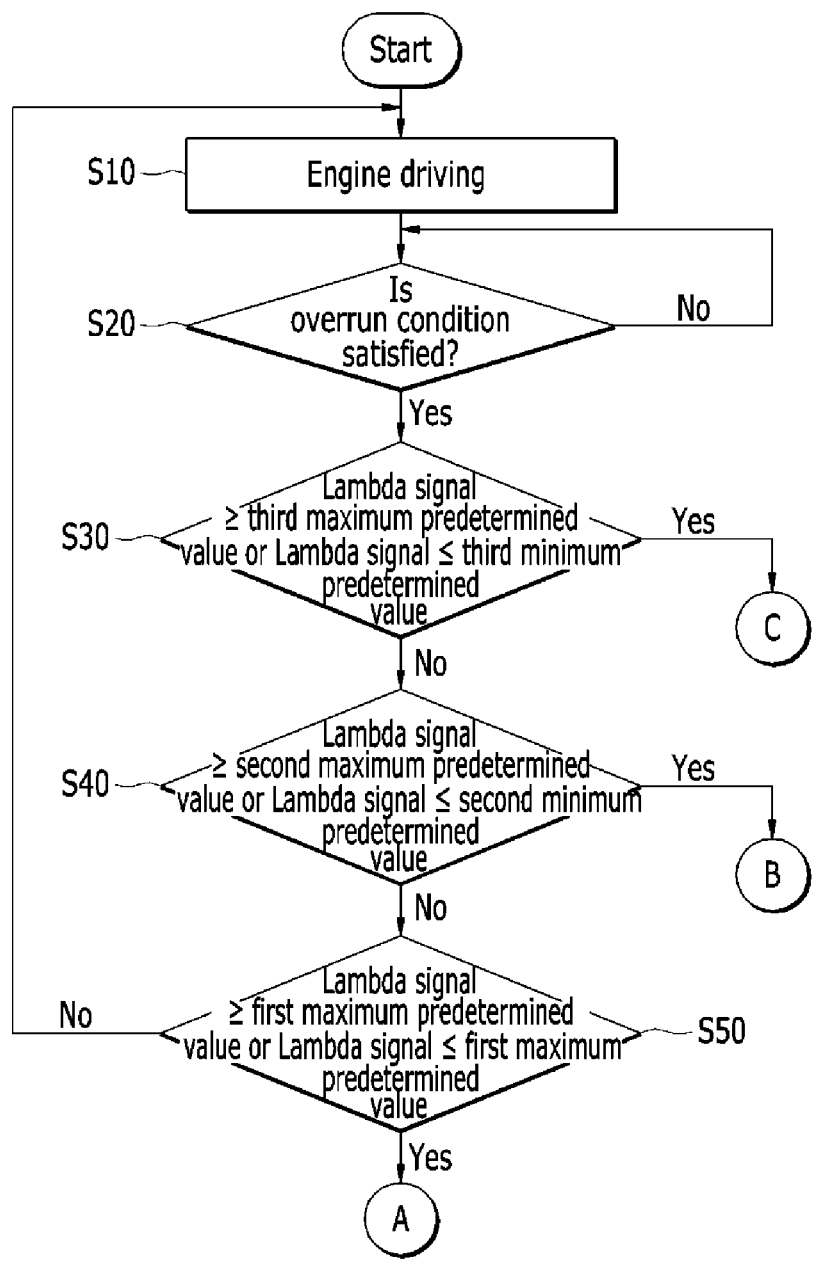
FIG. 3 to FIG. 6 are flowcharts showing a poison removing method of a lambda sensor according to the present disclosure.

As shown in FIG. 3, in the state that the engine is driving (S10), the control unit 20 determines whether the overrun condition is satisfied (S20).

The overrun condition of the engine may be a case that the accelerator pedal is not depressed while the vehicle is driving, like a coasting state or a braking state of the vehicle.

If the overrun condition of the engine is satisfied, the control unit 20 determines whether the lambda signal output from the lambda sensor 10 is larger than the maximum predetermined value or is smaller than the minimum predetermined value. In this case, the maximum predetermined value may be divided into a first maximum predetermined value, a second maximum predetermined value larger than the first maximum predetermined value, and a third maximum predetermined value larger than the second maximum predetermined value. Also, the minimum predetermined value may be divided into a first minimum predetermined value, a second minimum predetermined value smaller than the first minimum predetermined value, and a third minimum predetermined value smaller than the second minimum predetermined value.

In detail, it is determined whether the lambda signal is the third maximum predetermined value or more during the predetermined time or more, or is the third minimum predetermined value or less during the predetermined time or more (S30).

Figure 4:
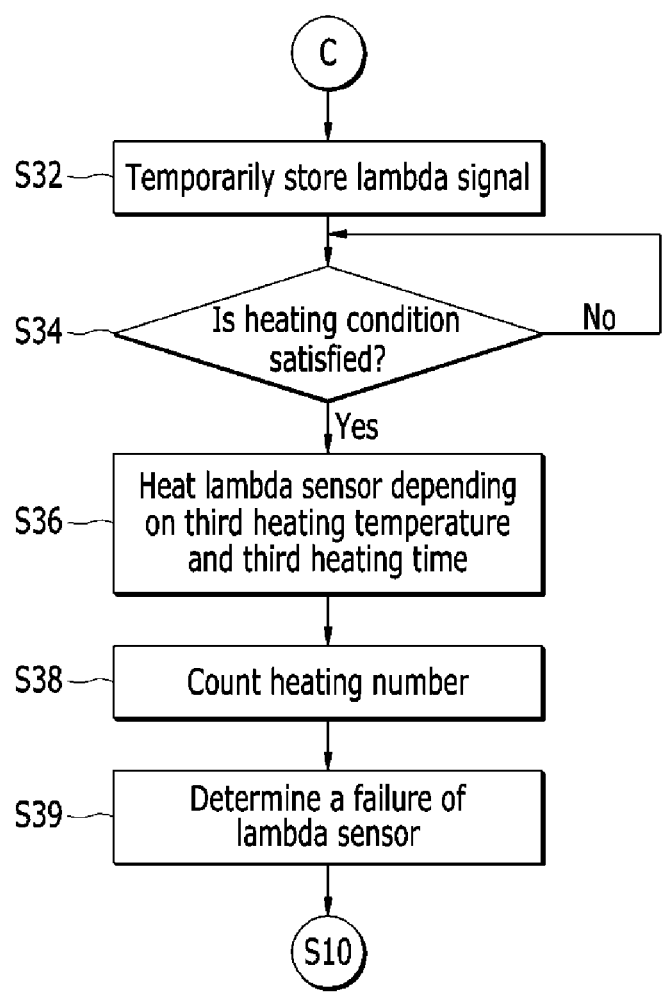

If the lambda signal is the third maximum predetermined value or more during the predetermined time or more, or is the third minimum predetermined value or less during the predetermined time or more, as shown in FIG. 4, the control unit 20 temporary stores the lambda signal (S32).

Also, the control unit 20 determines whether the heating condition of the lambda sensor 10 is satisfied (S34). The heating condition of the lambda sensor 10 is satisfied when the coolant temperature is greater than a predetermined coolant temperature in an idle state of the engine and outdoor temperature is greater than a predetermined outdoor temperature.

If the heating condition of the lambda sensor 10 is satisfied, the control unit 20 heats the lambda sensor 10 by setting the heating temperature and the heating time as the third heating temperature and the third heating time (S36).

The control unit 20 counts the number of times the lambda sensor 10 is heated (S38).

If the number of heating times is the predetermined number (for example, two times) or more, it is determined that the lambda sensor 10 is faulty (S39).

In the step S30, if the lambda signal is smaller than the third maximum predetermined value or is larger than the third minimum predetermined value, the control unit 20 determines whether the lambda signal is larger than the second maximum predetermined value during the predetermined time or more or is smaller than the second minimum predetermined value during the predetermined time or more (S40).

Figure 5:
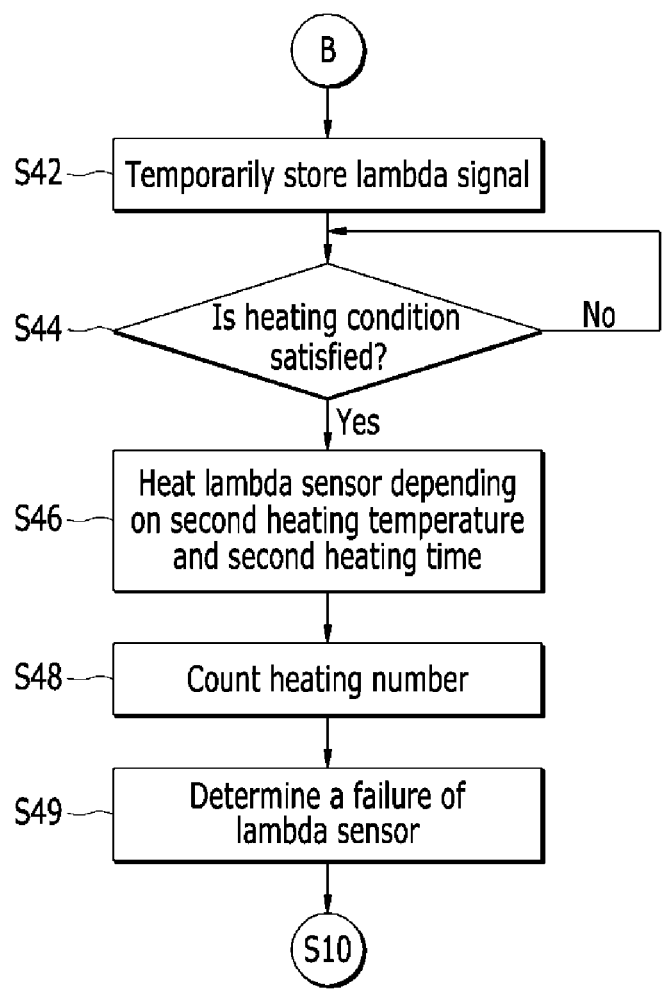

If the lambda signal is larger than the second maximum predetermined value during the predetermined time or more or is smaller than the second minimum predetermined value during the predetermined time or more, as shown in FIG. 5, the control unit 20 temporary stores the lambda signal (S42).

The control unit 20 determines whether the heating condition of the lambda sensor 10 is satisfied (S44).

If the heating condition of the lambda sensor 10 is satisfied, the control unit 20 sets the heating temperature and the heating time as second heating temperature lower than the third heating temperature and the second heating time shorter than the third heating time to heat the lambda sensor 10 (S46).

The control unit 20 counts the number of times the lambda sensor 10 is heated (S48).

If the number of heating times is the predetermined number (for example, two times) or more, it is determined that the lambda sensor 10 is faulty (S49).

In the step S40, if the lambda signal is smaller than the second maximum predetermined value or is larger than the second minimum predetermined value, the control unit 20 determines whether the lambda signal is larger than the first maximum predetermined value during the predetermined time or more or is smaller than first minimum predetermined value during the predetermined time or more (S50).

Figure 6:
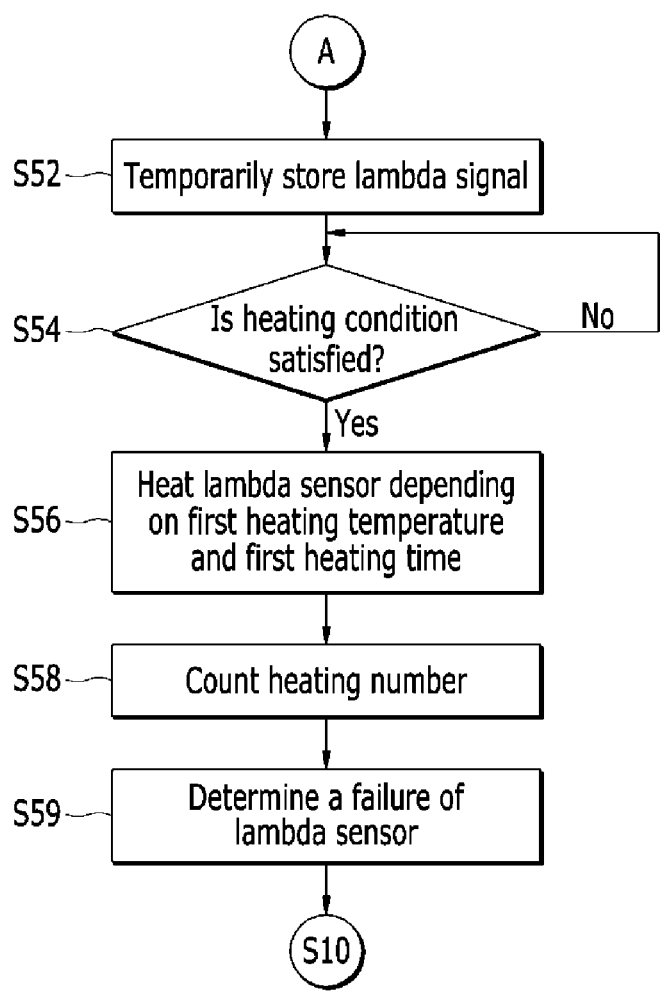

If the lambda signal is larger than the first maximum predetermined value during the predetermined time or more or is smaller than first minimum predetermined value during the predetermined time or more, as shown in FIG. 6, the lambda signal is temporary stored (S52).

The control unit 20 determines whether the heating condition of the lambda sensor 10 is satisfied (S54).

If the vehicle is in the after-run section, the control unit 20 sets the heating temperature and the heating time as the first heating temperature lower than the second heating temperature and the first heating time shorter than the second heating time to heat the lambda sensor 10 (S56).

The control unit 20 counts the number of heating times of the lambda sensor 10 (S58).

If the number of heating times is the predetermined number (for example, two times), it is determined that the lambda sensor 10 is faulty (S59).

As described above, when the lambda signal is larger than the maximum predetermined value or is smaller than the minimum predetermined value, the failure of the lambda sensor 10 is not determined. To remove the poison of the lambda sensor 10, after the lambda sensor 10 is heated by predetermined number of times, if the lambda signal is larger than the maximum predetermined value or is smaller than the minimum predetermined value, it is determined that the lambda sensor 10 is faulty. As described above, since the failure of the lambda sensor 10 is determined after the lambda sensor 10 is heated the predetermined number of times, the failure of the lambda sensor 10 may be correctly determined.

When the lambda sensor 10 is heated, the heating temperature and the heating time are differentiated depending on the magnitude of the lambda signal, and the heating temperature and the heating time may be appropriately set depending on the poison degree of the lambda sensor 10.

The number of heating times for the poison removing of the lambda sensor 10 is counted, and only in the case that the number of heating times is the predetermined number or more, since the failure of the lambda sensor 10 is determined, the failure of the lambda sensor 10 may be correctly determined.

Also, since the lambda sensor 10 is heated when the overrun condition and heating condition are satisfied, the lambda sensor 10 can be heated whenever necessary without affecting vehicle behavior, emissions, and fuel consumption.

DESCRIPTION OF SYMBOLS

10: lambda sensor
12: electrode

14: heater
20: control unit
30: engine
40: exhaust line

While this present disclosure has been described in connection with what is presently considered to be practical embodiments, it is to be understood that the present disclosure is not limited to the disclosed embodiments, but, on the contrary, is intended to cover various modifications and equivalent arrangements included within the spirit and scope of the appended claims.

What is claimed is:

1. An apparatus for removing a poison of a lambda sensor, comprising:
    a lambda sensor configured to detect an oxygen concentration included in an exhaust gas; and
    a control unit configured to differentiate a heating temperature and a heating time and configured to remove a poison from the lambda sensor depending on a lambda signal from the lambda sensor when a heating condition of the lambda sensor and an overrun section of an engine are satisfied; wherein the control unit is configured to increase the heating temperature and the heating time step-by-step as the lambda signal is increased when the lambda signal is larger than a maximum predetermined value during a predetermined time or more, or the control unit is configured to increase the heating temperature and the heating time step-by-step as the lambda signal is decreased when the lambda signal is smaller than a minimum predetermined value during the predetermined time or more.

2. The apparatus of claim 1, wherein the heating condition of the lambda sensor is satisfied when a coolant temperature is greater than a predetermined coolant temperature in an idle state of the engine and an outdoor temperature is greater than a predetermined outdoor temperature.

3. The apparatus of claim 1, wherein the overrun section of the engine is one in which a vehicle is in a coasting state or a braking state.

4. The apparatus of claim 1, wherein the maximum predetermined value is divided into a first maximum predetermined value, a second maximum predetermined value larger than the first maximum predetermined value, and a third maximum predetermined value larger than the second maximum predetermined value, and wherein the minimum predetermined value is divided into a first minimum predetermined value, a second minimum predetermined value smaller than the first minimum predetermined value, and a third minimum predetermined value smaller than the second minimum predetermined value.

5. The apparatus of claim 4, wherein when the lambda signal is larger than the first maximum predetermined value during a predetermined time or more, or the lambda signal is smaller than the first minimum predetermined value during the predetermined time or more, the control unit is configured to set the heating temperature and the heating time as a first heating temperature and a first heating time to heat the lambda sensor.

6. The apparatus of claim 5, wherein when the lambda signal is larger than the second maximum predetermined value during the predetermined time or more, or the lambda signal is smaller than the second minimum predetermined value during the predetermined time or more, the control unit is configured to set the heating temperature and the heating time as a second heating temperature higher than the first heating temperature and a second heating time longer than the first heating time to heat the lambda sensor.

7. The apparatus of claim 6, wherein when the lambda signal is the third maximum predetermined value or more during the predetermined time or more, or the lambda signal is the third minimum predetermined value or less during the predetermined time or more, the control unit is configured to set the heating temperature and the heating time as a third heating temperature higher than the second heating temperature and a third heating time longer than the second heating time to heat the lambda sensor.

8. The apparatus of claim 1, wherein the control unit is configured to determine that the lambda sensor is faulty when a number of heating times of the lambda sensor is a predetermined number or more.

9. A method for removing a poison of a lambda sensor, comprising:
    determining whether an overrun condition is satisfied in a state that an engine is driving;
    determining whether a lambda signal output from the lambda sensor is larger than a maximum predetermined value during a predetermined time or more, or whether the lambda signal output is smaller than a minimum predetermined value during a predetermined time or more;
    determining whether a heating condition of the lambda sensor is satisfied; and
    differentiating a heating temperature and a heating time to remove a poison from the lambda sensor depending on a magnitude of the lambda signal output to heat the lambda sensor when a overrun condition and a heating condition are satisfied; wherein when the lambda signal output is larger than a maximum predetermined value during a predetermined time or more, the heating temperature and the heating time are increased step-by-step as the lambda signal output is increased, and when the lambda signal output is smaller than a minimum predetermined value during a predetermined time or more, the heating temperature and the heating time are increased step-by-step as the lambda signal output is decreased.

10. The method of claim 9, wherein the heating condition of the lambda sensor is satisfied when a coolant temperature is greater than a predetermined coolant temperature in an idle state of the engine and an outdoor temperature is greater than a predetermined outdoor temperature.

11. The method of claim 9, wherein the overrun condition of the engine is one in which a vehicle is in a coasting state or a braking state.

12. The method of claim 9, wherein the maximum predetermined value is divided into a first maximum predetermined value, a second maximum predetermined value larger than the first maximum predetermined value, and a third maximum predetermined value larger than the second maximum predetermined value, and wherein the minimum predetermined value is divided into a first minimum predetermined value, a second minimum predetermined value smaller than the first minimum predetermined value, and a third minimum predetermined value smaller than the second minimum predetermined value.

13. The method of claim 12, wherein when the lambda signal output is larger than the first maximum predetermined value during a predetermined time or more, or when the lambda signal output is smaller than the first minimum predetermined value during the predetermined time or more, the heating temperature and the heating time are set as a first heating temperature and a first heating time to heat the lambda sensor.

14. The method of claim 13, wherein when the lambda signal output is larger than the second maximum predetermined value during the predetermined time or more or when the lambda signal output is smaller than the second minimum predetermined value during the predetermined time or more, the heating temperature and the heating time are set as a second heating temperature higher than the first heating temperature and a second heating time longer than the first heating time to heat the lambda sensor.

15. The method of claim 14, wherein when the lambda signal output is the third maximum predetermined value or more during the predetermined time or more, or when the lambda signal output is the third minimum predetermined value or less during the predetermined time or more, the heating temperature and the heating time are set as a third heating temperature higher than the second heating temperature and a third heating time longer than the second heating time to heat the lambda sensor.

16. The method of claim 9, further comprising:
counting a number of times the lambda sensor is heated; and
determining that the lambda sensor is faulty when the heating number is a predetermined number or more.

* * * * *